Patented July 31, 1934

1,968,033

UNITED STATES PATENT OFFICE 1,968,033

PROCESS AND PRODUCT RELATING TO TERTIARY ETHERS

Theodore Evans, Oakland, and Karl R. Edlund, Berkeley, Calif., assignors to Shell Development Company, San Francisco, Calif., a corporation of Delaware No Drawing. Application December 28, 1931, Serial No. 583,608

18 Claims. (Cl. 260—151)

This invention relates to tertiary ethers of aliphatic polyhydric alcohols and to their mode of production.

The expression "tertiary ether" comprehends an ether wherein at least one oxygen atom is linked to a carbon atom which in turn is linked to three other carbon atoms. Since the tertiary ethers in the present invention are formed by the reaction of an aliphatic polyhydric alcohol with a tertiary-base olefine (olefine capable of forming a tertiary alcohol by hydration) in the presence of a condensing agent, it is possible to regulate the number of ethereal groups to be in the resulting product by quantitative control of the tertiary-base olefine, adjustment of temperature and reaction period and the like. There may be formed as many ethereal groupings as there are hydroxyl groups in the polyhydric alcohol or there may be less; at no time there being less than one tertiary alkyl grouping bonded to an oxygen atom.

We are aware that alkyl ethers of aliphatic polyhydric alcohols have been prepared before. However, prior investigators have been primarily concerned with primary and/or secondary ethers due to the difficulties attendant with the preparation of tertiary ethers. Our invention is concerned solely with tertiary ethers and their production.

We have discovered that tertiary alkyl ethers of aliphatic polyhydric alcohols can be easily and simply prepared by the direct addition of a tertiary-base olefine (such as tertiary butylene, amylene, hexylene and the like) to an aliphatic polyhydric alcohol in the presence of a condensing agent. Ethylene glycol and its homologues such as propylene glycol, butylene glycol and the like as well as glycerol, sorbitol, erythritol, pentaerythritol, mannitol, etc., are easily adapted for our process. Many of the well-known condensing agents can be employed in our process but we have found acids, particularly strongly ionizable acids as $H_2SO_4$ and $HCl$, and acid salts, such as the acid sulfates of alkali-metals, well suited for our process. Inorganic salts as the heavy metal halides, particularly $AlCl_3$, can be used to advantage in our reaction. In certain instances, it may be desirable to employ known alkaline condensing agents and we contemplate their inclusion. Our invention is not limited to any specific condensing agent altho preference is had to certain ones due to features of economy, ease of handling, flexibility of control, etc.

The process can be executed at normal, elevated or subatmospheric pressure depending on particular operating conditions. We have utilized moderately elevated pressures as the process lends itself quite readily to excellent yields thereunder without complicating the set-up of reaction units.

The process can be conducted at varying temperatures depending on the pressure employed, the quantity and character of the tertiary-base olefine, the concentration and character of the aliphatic polyhydric alcohol, the concentration and character of the condensing agent, the reaction period, etc. It is desirable to permit the reaction to proceed to equilibrium under the particular operating conditions chosen before recovering the tertiary ether. Under normal pressure and operating conditions, a temperature range between 50° and 150° C. has been found to give excellent results.

For purposes of illustration only, reference will be had to several examples setting out modes of procedure for preparing certain specific tertiary ethers although it is to be understood that such disclosure is to be regarded as illustrative and not limitative.

1

444 gm. ethylene glycol, 218 gm. tertiary butylene and 12 gm. $H_2SO_4$ are reacted for 1½ hours at 75° C. The reaction mixture is then cooled and vacuum distilled at about 22 mm. until the temperature reaches 80° C. This distillate, amounting to 280 gm., is freed of any $H_2SO_4$ it may have present through entrainment, and redistilled at 24 mm. whereby over 90% of it is recovered at about 62° to 64° C. This material is a mixture of the mono- and di-ethers. To separate these two compounds advantage may be taken of the fact that the mono-ether is water-soluble while the di-ether is not; or recourse may be had to steam distillation. In the latter case, a heterogeneous azeotrope first comes over at 97° C. This, upon water washing and drying, gives chiefly the di-ether. After all the 97° C. azeotrope has been collected, the temperature rises to 98.2°–98.5° C. where a homogeneous azeotrope appears. This material upon salting separates into two layers, the upper layer consisting mainly of the mono-ether.

These materials are then purified by distillation. The mono-ether has a B. P. 152.5° C. (760 mm.) and its $$d\frac{20}{4}$$

is 0.8970; the di-ether has a B. P. 171° C. (760 mm.) with slight decomposition, B. P. about 87° C. (45 mm.), B. P. about 62° C. (12 mm.) and its $$d\frac{20}{4}$$

is 0.8266.

2

220 gm. to 230 gm. of the commercially available mono-ether e. g. the mono-methyl, ethyl, or n-butyl ether of ethylene glycol, 220 to 280 gm. tertiary butylene, and 18 gm. $H_2SO_4$ are reacted at 75° C. for 1½ hours. The mixture is then cooled, drained into 800 c. c. ice-cold, dilute caustic, and the residual butylene distilled out. After cooling, the upper layer in the flask is separated, dried and distilled, whereby the mixed di-ether is obtained, for example, the tertiary butyl methyl ether of glycol if glycol monomethyl ether was the starting material. The yields are approximately 250 gm. in each case. The following properties were determined: Tertiary butyl mono-methyl ether of glycol, B. P. 131° to 132° C. (760 mm.), $$d\frac{20}{4}0.8399;$$

tertiary butyl mono-ethyl ether of glycol, B. P. 147.5° C. (760 mm.), $$d\frac{20}{4}0.8311;$$

tertiary btuyl mono n-butyl ether of glycol, B. P. 83.4° C. (20 mm.), $$d\frac{20}{4}0.8317.$$

3

400 gm. 1,2 propylene glycol, 200 gm. tertiary butylene and 36 gm. $H_2SO_4$ are heated at 75° C. for one hour. The mixture is then cooled, sufficient alkali added to neutralize the acid, the material filtered and distilled. The ether (probably the α ether) is obtained at 151° to 153° C. The yield was at least 200 gm. The mono-ether has $$d\frac{20}{4}=0.8707.$$

4

500 gm. glycerol, 275 gm. tertiary butylene, and 18 gm. $H_2SO_4$ are heated at 75° C. for two hours. The mixture is cooled, neutralized and vacuum distilled at 12 mm. until the temperature reaches 168° C. This material, redistilled at 5 mm., gives the mono-ether at 93° to 94° C. in a yield of 150 gm. (α ether in all probability). Its $$d\frac{20}{4}=0.9947.$$

It is a viscous liquid, dissolves nitrocellulose, and is completely miscible with water.

5

250 gm. glycerol, 400 gm. tertiary butylene, and 18 gm. $H_2SO_4$ are reacted at 75° C. for 1½ hours. The mixture is cooled, treated with sufficient concentrated alkali solution to neutralize the acid, and vacuum distilled, the main fraction coming over at 88° to 95° C. at 3 to 4 mm. This material is washed with an equal volume of water, the upper layer dried with sodium chloride, and redistilled, the di-ether being collected at 80° to 84° C. at 4 mm. in a yield of 225 gm. Thus by using an excess of butylene instead of an excess of glycerol, a water immiscible material, apparently the 1–3 ether, is obtained. It boils at 81° to 82° C. at 3.5–4 mm., at 221° C. at 760 mm., has $$d\frac{20}{4}=0.8921,$$

possesses a faint, pleasant odor, and dissolves nitrocellulose.

6

500 gm. diethylene glycol, 170 gm. tertiary butylene, and 18 gm. $H_2SO_4$ are reacted at 75°–80° for 1½ hours. The mixture is then cooled, the acid neutralized, and distilled. The product, mono tertiary butyl ether of diethylene glycol, is obtained at about 73° under a pressure of 2–3 mm. of mercury.

$$d\frac{20}{4}=0.9374.$$

The yield is around 300 gm.

7

400 gm. ethylene glycol, 250 gm. tertiary-base amylene, and 18 gm. $H_2SO_4$ are reacted at 75° for two hours. Upon cooling the mixture is drained, when it will be found in two phases, each containing about 400 cc. The upper phase is treated with a little caustic, the amylenes removed by distillation at atmospheric pressure, and the remainder then vacuum distilled. The mono tertiary amyl ether of ethylene glycol is obtained at 50°–55° at 3 mm.;

$$d\frac{20}{4}=0.8993.$$

The lower layer upon neutralization and distillation will give a little more of the ether.

8

400 gm. ethylene glycol, 200 gm. tertiary butylene, and 30 cc. of concentrated aqueous hydrochloric acid are reacted at 75° for two hours. The product diluted with water and distilled, gives a mixture of the mono and di ethers as previously described in the case of $H_2SO_4$ as the catalyst.

Instead of employing single tertiary olefines, two or more tertiary olefines may be used simultaneously.

Polyglycols as well as the ordinary glycols of commerce may be employed. The polyglycol may be symmetrical such as di-propylene glycol, dibutylene glycol, triethylene glycol and the like; or may be asymmetrical as ethylene-propylene glycol, ethylene butylene glycol, propylene butylene glycol and the like.

The glycols including the polyglycols may be of the straight chain or forked chain type, isobutylene glycol, isobutylene isopropylene glycol, isobutylene ethylene glycol, etc., being representative of the latter.

The empirical formula R—O—(CH$_2$)$_n$—O—R' where R represents hydrogen, or an alkyl group of primary, secondary or tertiary characteristics, R' represents a tertiary alkyl grouping and $n$ is greater than one, the OR and OR' groups being on different carbon atoms, typifies the glycol class of tertiary ethers. The empirical grouping $(CH_2)_n$ may represent a straight chain as in propylene glycol or a branched chain as in isobutylene glycol.

The reacting materials are preferably anhydrous or nearly so, though the presence of water appears to have no detrimental effect other than to decrease the yield.

The ethers are of high-boiling point and more or less viscous. In many cases they have the advantage over the polyhydric alcohols, such as glycerol, of having a lower hygroscopicity and viscosity. In numerous cases they can be used as substitutes for the polyhydric alcohols, whether in connection with dyeing, the explosives industry, textile industry, or as constituents of lubricants for machinery and the like. They are also applicable for solvent or preparation purposes. In certain cases their solutions can be used as cooling liquids for internal-combustion engines; the compounds can be utilized as extraction agents for essential oils in the manufacture of flavors and perfumes; and those which are nitrocellulose solvents of sufficiently high boiling point can be used as plasticizers for cellulose esters.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. The process of preparing tertiary ethers of aliphatic polyhydric alcohols, comprising, reacting an aliphatic polyhydric alcohol with a tertiary-base olefine in the presence of a condensing agent.

2. The process of preparing tertiary ethers of aliphatic polyhydric alcohols, comprising, reacting an aliphatic polyhydric alcohol with a tertiary-base olefine in the presence of an acidic condensing agent.

3. The process of preparing tertiary ethers of aliphatic polyhydric alcohols, comprising, reacting an aliphatic polyhydric alcohol with a tertiary-base olefine in the presence of $H_2SO_4$.

4. The process of preparing tertiary ethers of aliphatic polyhydric alcohols, comprising, reacting a compound of the empirical formula $R-O(CH_2)_nOH$ wherein R represents hydrogen or a primary, secondary or tertiary alkyl group and $n>1$ with a tertiary-base olefine in the presence of a condensing agent.

5. The process of preparing tertiary ethers of aliphatic polyhydric alcohols, comprising, reacting a compound of the empirical formula $R-O(CH_2)_nOH$ wherein R represents hydrogen or a primary, secondary or tertiary alkyl group and $n>1$ with a tertiary base olefine in the presence of $H_2SO_4$.

6. The process of preparing tertiary ethers of aliphatic dihydric alcohols, comprising, reacting an aliphatic dihydric alcohol with a tertiary-base olefine in the presence of a condensing agent.

7. The process of preparing tertiary ethers of aliphatic trihydric alcohols, comprising, reacting an aliphatic trihydric alcohol with a tertiary-base olefine in the presence of $H_2SO_4$.

8. An aliphatic tertiary ether of an aliphatic polyhydric alcohol the ethereal group containing at least five carbon atoms.

9. An aliphatic mono-tertiary ether of an aliphatic polyhydric alcohol.

10. An aliphatic di-tertiary ether of an aliphatic polyhydric alcohol at least one of the ethereal groups containing at least five carbon atoms.

11. An aliphatic tertiary ether of a glycerol wherein an ethereal group contains at least five carbon atoms.

12. An aliphatic tertiary ether of a glycol.

13. An aliphatic tertiary ether of a polyglycol.

14. An aliphatic di-tertiary ether of a glycol.

15. A tertiary ether of a compound possessing the empirical formula $R-O(CH_2)_nOR'$ wherein R represents hydrogen or a primary, secondary or tertiary alkyl group, R' represents a tertiary alkyl group and $n>1$, the oxy-groups being on different carbon atoms.

16. A tertiary ether of a compound possessing the formula $HO(CH_2)_nOR'$ wherein R' represents a tertiary alkyl group and $n>1$, the oxy group being on different carbon atoms.

17. A mono tertiary butyl ether of an aliphatic polyhydric alcohol.

18. A tertiary amyl ether of an aliphatic polyhydric alcohol.

THEODORE EVANS.
KARL R. EDLUND.